United States Patent
Sweet

(10) Patent No.: US 12,543,923 B2
(45) Date of Patent: Feb. 10, 2026

(54) METHOD AND SYSTEM OF INFERRING STATE OF AN INDUCTIVE POWERED LOAD

(71) Applicants: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

(72) Inventor: Charles Mark Sweet, Newton, MA (US)

(73) Assignees: SMITH & NEPHEW, INC., Memphis, TN (US); SMITH & NEPHEW ORTHOPAEDICS AG, Memphis, TN (US); SMITH & NEPHEW ASIA PACIFIC PTE. LIMITED, Switzerland (SG)

( * ) Notice: Subject to any disclaimer, the term of this patent is extended or adjusted under 35 U.S.C. 154(b) by 567 days.

(21) Appl. No.: 17/998,426

(22) PCT Filed: Jun. 11, 2021

(86) PCT No.: PCT/US2021/037067
§ 371 (c)(1),
(2) Date: Nov. 10, 2022

(87) PCT Pub. No.: WO2021/257405
PCT Pub. Date: Dec. 23, 2021

(65) Prior Publication Data
US 2023/0172424 A1 Jun. 8, 2023

Related U.S. Application Data

(60) Provisional application No. 63/039,572, filed on Jun. 16, 2020.

(51) Int. Cl.
A61B 1/00 (2006.01)
A61B 1/045 (2006.01)
A61B 1/06 (2006.01)

(52) U.S. Cl.
CPC ...... *A61B 1/00006* (2013.01); *A61B 1/00029* (2013.01); *A61B 1/00059* (2013.01); *A61B 1/045* (2013.01); *A61B 1/0684* (2013.01)

(58) Field of Classification Search
CPC ............ A61B 1/00016; A61B 1/00029; A61B 1/00057; A61B 1/00059; A61B 1/00105;
(Continued)

(56) References Cited

U.S. PATENT DOCUMENTS 5,425,704 A * 6/1995 Sakurai ................. A61B 8/546
606/128
5,688,235 A * 11/1997 Sakurai ................. A61B 50/13
606/1
(Continued)

OTHER PUBLICATIONS

International Searching Authority, International Application No. PCT/US2021/037067, International Filing Date: Jun. 11, 2021, International Search Report and Written Opinion dated Oct. 1, 2021.

*Primary Examiner* — Michael J Carey
*Assistant Examiner* — Stephen Floyd London
(74) *Attorney, Agent, or Firm* — Dickinson Wright PLLC

(57) ABSTRACT

Inferring state of an inductive powered load. At least one example embodiment is a method including: applying (502), by a controller (200) within a camera head (102), an identification signal to a primary winding (212) of a transformer (218) within the camera head (102) for an endoscopic system (100), the identification signal having a swept frequency; measuring (504), by the controller, power as a function of frequency (300, 302, 304) of the identification signal during application of the identification signal; and determining (506) by the controller whether the camera head (Continued)

(102) is mechanically coupled to an endoscope (104) based on the power as a function of frequency of the identification signal (300, 302, 304).

12 Claims, 5 Drawing Sheets

(58) Field of Classification Search
CPC ..... A61B 1/042; A61B 1/0655; A61B 1/0684; H02J 50/12
USPC ...................................................... 340/10.42
See application file for complete search history.

(56) References Cited

U.S. PATENT DOCUMENTS

| | | | | |
|---|---|---|---|---|
| 6,092,722 | A * | 7/2000 | Heinrichs | A61B 90/98 235/375 |
| 7,914,442 | B1 | 3/2011 | Gazdzinski | |
| 10,284,765 | B1 * | 5/2019 | Bunker | H04N 23/20 |
| 2002/0184122 | A1 * | 12/2002 | Yamaguchi | G07F 17/04 705/30 |
| 2005/0033201 | A1 * | 2/2005 | Takahashi | A61B 17/320068 601/2 |
| 2007/0100202 | A1 * | 5/2007 | Murata | A61B 1/00059 600/109 |
| 2009/0093690 | A1 * | 4/2009 | Yoshizawa | A61B 1/00036 600/300 |
| 2011/0025132 | A1 * | 2/2011 | Sato | H01Q 1/2225 307/104 |
| 2011/0193948 | A1 * | 8/2011 | Amling | A61B 1/00029 348/E7.085 |
| 2013/0137377 | A1 * | 5/2013 | Endo | A61B 1/00059 455/66.1 |
| 2016/0220095 | A1 * | 8/2016 | Shimomura | A61B 1/00006 |
| 2019/0069760 | A1 * | 3/2019 | Hygelund | A61B 1/00006 |

* cited by examiner

US 12,543,923 B2

METHOD AND SYSTEM OF INFERRING STATE OF AN INDUCTIVE POWERED LOAD

CROSS-REFERENCE TO RELATED APPLICATIONS

This application is a U.S. National Phase Entry of PCT App. No. PCT/US2021/037067 filed Jun. 11, 2021 titled "Method and System of Inferring State of an Inductive Powered Load." The PCT application claims the benefit of U.S. Provisional Application Ser. No. 63/039,572 filed Jun. 16, 2020 titled "Method and System of Inferring State of an Inductive Powered Load." The PCT application and the provisional application are incorporated by reference herein as if reproduced in full below.

BACKGROUND

An endoscope is a device used in arthroscopic procedures to enable a surgeon to visualize or "see" within the surgical field. In related-art devices, illumination originates in a light controller, and is provided to the endoscope by way of an optical cable having one more optical fibers. The light traverses through the endoscope in further optical fibers or glass rods, and ultimately shines from a distal end of the endoscope into the surgical field.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices, the terms "input" and "output" refer to electrical connections to the electrical devices, and shall not be read as verbs requiring action. For example, a controller may have a gate output and one or more sense inputs.

"Controller" shall mean individual circuit components, an application specific integrated circuit (ASIC), a microcontroller with controlling software, a digital signal processor (DSP), a processor with controlling software, a field programmable gate array (FPGA), or combinations thereof, that read inputs and drive outputs responsive to the inputs.

"Swept frequency" shall not require a smoothly varying frequency over the period of time.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to endoscopic systems having a camera head and an endoscope, and where the source of light (e.g., a light emitting diode (LED)) is disposed within the endoscope. More particularly, example embodiments are directed to endoscopic systems where the camera head wirelessly powers the LED within the endoscope, and the wirelessly powering provides electrical isolation between the camera head on the one hand, and the patient and endoscope on the other hand. More particularly still, example embodiments are directed to a camera head that determines whether it is mechanically coupled to an endoscope, and if mechanically coupled the camera head further determines whether the endoscope accepts wireless power to power an LED within the endoscope. The specification turns to an example system to orient the reader.

Figure 1:
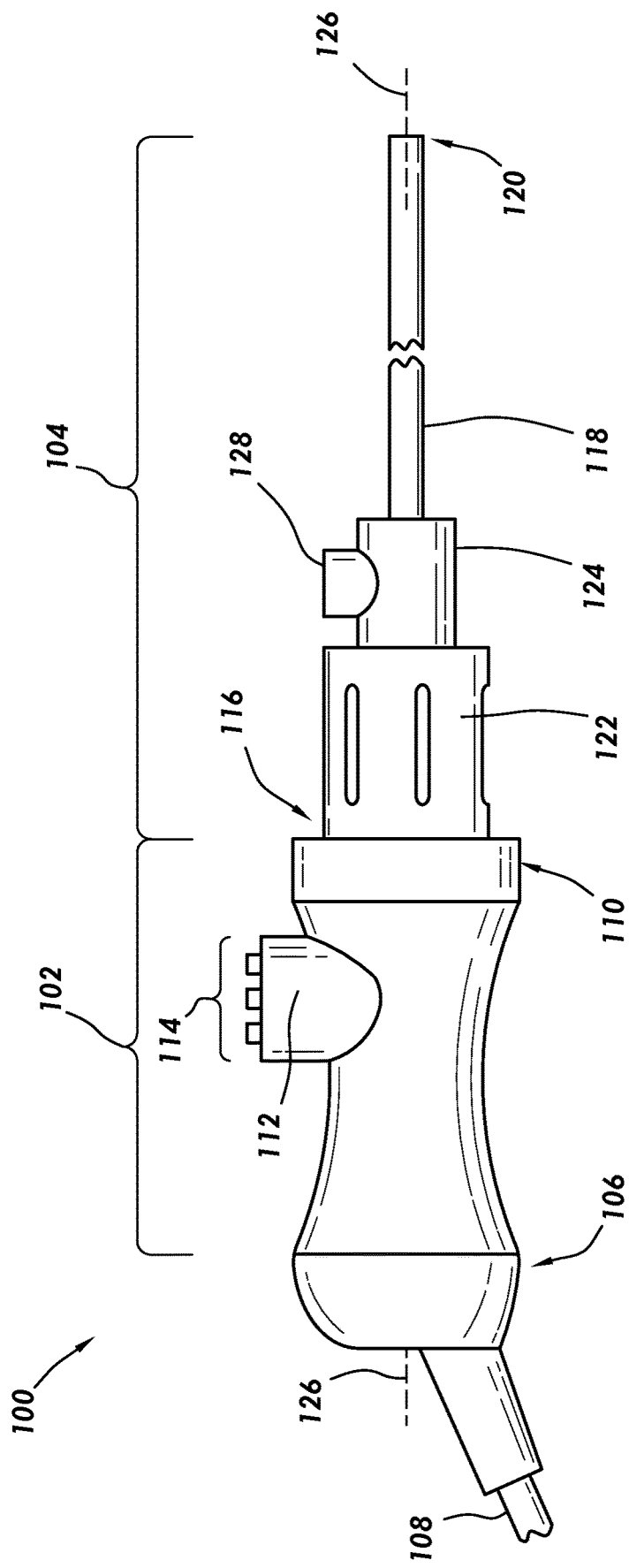
FIG. 1 shows a side elevation view of an endoscopic system, in accordance with at least some embodiments.

FIG. 1 shows a side elevation view of an endoscopic system, in accordance with at least some embodiments. In particular, the example endoscopic system 100 comprises a camera head 102 coupled to an endoscope 104. The camera head 102 has a proximal end 106 that defines a power and communication cable 108 (hereafter just cable 108). The cable 108 couples to source of power (not specifically shown) and a one or more video display devices (also not specifically shown). The camera head 102 also defines a distal end 110 designed and constructed to mechanically and optically couple to the endoscope 104. The example camera head 102 defines a button stand 112 defining a plurality of buttons 114 through which a surgeon interacts with the camera head 102 (e.g., controlling brightness of the LED in the endoscope).

The endoscope 104 defines a proximal end 116 designed and constructed to mechanically and optically couple to the distal end 110 of the endoscope 104. The endoscope 104 further includes a tube 118 that defines a distal end 120 of the endoscope 104. An internal volume of the tube 118 contains optical elements (e.g., optical fiber and/or glass rods) that transmit light to emanate from the distal end 120 of the endoscope 104. The internal volume of the tube 118 further comprises optical elements to channel light reflected from the surgical field back through the tube 118 and into the camera head 102. The camera head 102, in turn, captures the light and communicatively couples a visualization signal through the cable 108 to one or more video display devices.

The example endoscope 104 implements two optical adjustments, one for focusing the light channeled back through the tube 118 from the surgical field, and one for depth of field (e.g., similar to an aperture setting on a camera lens). In the example system the two adjustments are made by turning a first rotatable member 122 and/or a second rotatable member 124. The first rotatable member 122 defines an axis of rotation, which in some example cases is an optical axis 126 of the endoscope 104. Inasmuch as the camera head 102 receives optical signals from the endoscope 104, the optical axis 126 of the endoscope 104 may be a shared optical axis of the camera head 102 when the camera head 102 and the endoscope 104 are mechanically coupled together. The second rotatable member 124 also defines an axis of rotation, which in some example cases is the optical axis 126.

The example endoscope 104 further includes a light post 128 defined on the second rotatable member 124. The light post 128 contains one or more LEDs that, when wirelessly powered by the camera head 102, provide light along the tube 118 and into the surgical field. In some example systems the light post 128 turns with the second rotatable member 124, and thus position of the light post 128 relative to the camera head is not rotationally fixed relative to the optical axis 126, and is not rotationally fixed relative to the first rotatable member 122.

Figure 2:
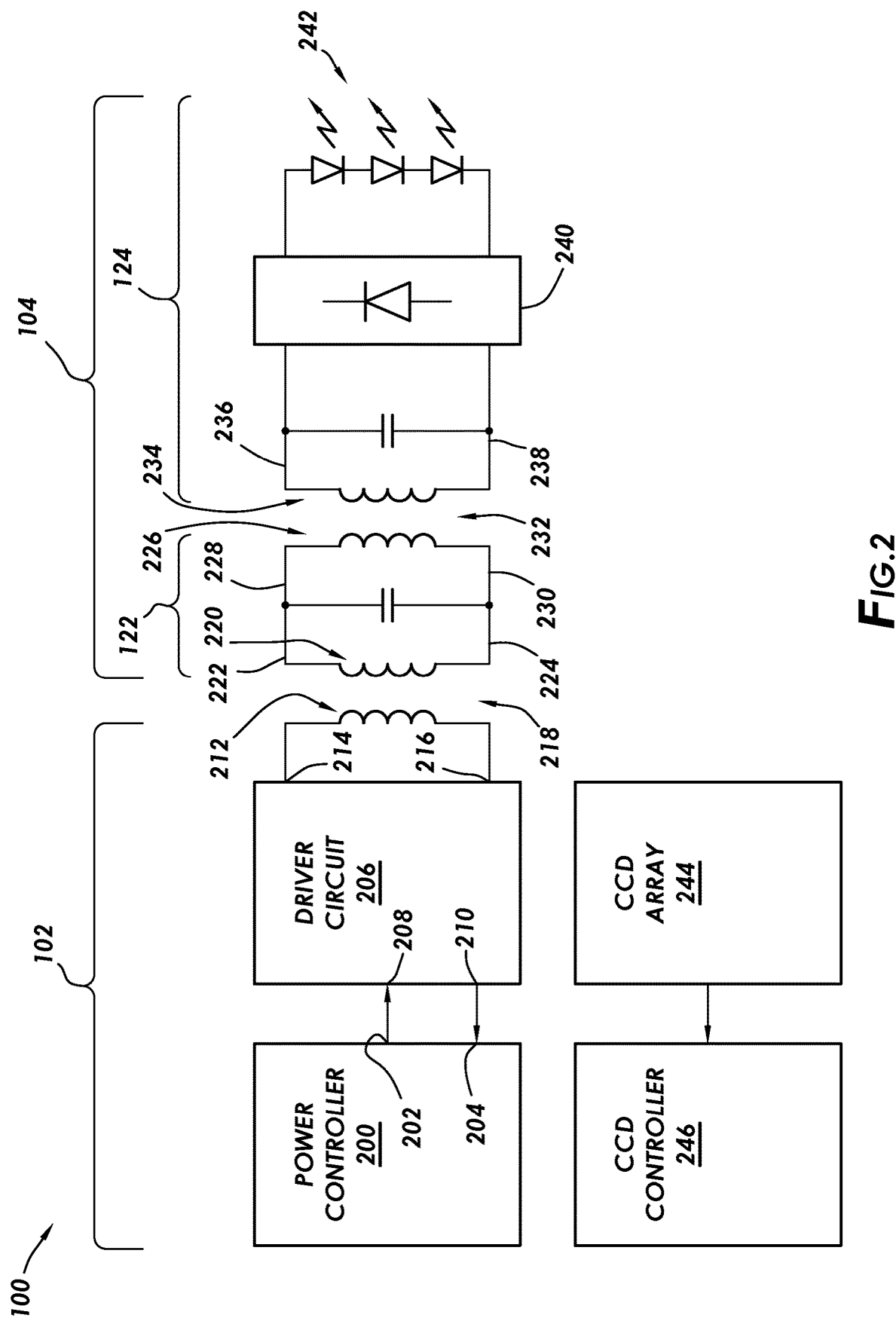
FIG. 2 shows a circuit diagram of the endoscopic system in accordance with at least some embodiments.

FIG. 2 shows a partial block diagram, partial circuit diagram, of the endoscopic system in accordance with at least some embodiments. In particular, the example system comprises a power controller 200 defining a drive output 202 and a power sense input 204. The power controller 200 couples to a driver circuit 206 having a drive input 208 and a power sense output 210. The drive output 202 of the power controller 200 is coupled to the drive input 208 of the driver circuit 206. The power sense output 210 of the driver circuit 206 is coupled to the power sense input 204 of the power controller 200. The example system further comprises a primary winding 212 that defines a first lead 214 and a second lead 216, and both leads are coupled to the driver circuit 206. The primary winding 212 is disposed within the camera head 102, and comprises windings (e.g., two circular loops) where the loops circumscribe the optical axis 126 (FIG. 1) of the camera head 102. Stated otherwise, each loop of wire that makes up the primary winding defines a central axis, and in some embodiments the central axis of each loop is coaxial. In some cases the central axes of the loops are also coaxial with the optical axis 126. However, in other cases the loops may take any suitable shape (e.g., square, rectangular, oblong). Moreover, the central axes, regardless of the shapes of the loops, may be either coaxial or parallel to the optical central axis 126. In accordance with example embodiments, the primary winding 212 is disposed within camera head 102 at the distal end 110, close to the endoscope 104. In some cases, the distal end 110 camera head 102 is made of a non-metallic material, such as a plastic material (e.g., polyether ether ketone (PEEK)), and the primary winding 212 is disposed within an internal volume of the camera head 102 abutting or disposed within the non-metallic material. As will be discussed in greater detail below, the primary winding 212 is a portion of a first rotary transformer 218 that couples energy wirelessly from the camera head 102 to the endoscope 104 across an air gap.

The second portion of the first rotatory transformer 218 comprises a secondary winding 220 that defines a first lead 222 and a second lead 224. The secondary winding 220 comprises windings (e.g. one circular loop) where the loop or loops circumscribe the optical axis 126 (FIG. 1) of the endoscope 104. Stated otherwise, each loop of wire that makes up the secondary winding 220 defines a central axis, and in some embodiments the central axis of each loop is coaxial. In some cases the central axes of the loops are also coaxial with the optical central axis 126. However, in other cases the loops may take any suitable shape (e.g., square, rectangular, oblong). Moreover, the central axes, regardless of the shapes of the loops, may be either coaxial or parallel to the optical central axis 126. In accordance with example embodiments, the secondary winding 220 is disposed within endoscope 104, and specifically disposed within the first rotatable member 122. The secondary winding 220 is part of the first rotary transformer 218 along with the primary winding 212, and the first rotary transformer 218 couples energy wirelessly from the camera head 102 to the endoscope 104 across an air gap.

The example system further comprises a primary winding 226 that defines a first lead 228 and a second lead 230. The primary winding 226 is disposed within the first rotatable member 122, and comprises windings (e.g. two circular loops) where the loops circumscribe the optical axis 126 (FIG. 1) of the endoscope. The variants discussed above regarding loops of the windings are equally applicable here, and will not be repeated so as not to unduly lengthen the specification. In accordance with example embodiments, the primary winding 226 is disposed within and at a distal end of the first rotatable member 122 close to the second rotatable member 124. As will be discussed in greater detail below, the primary winding 226 is a portion of a second rotary transformer 232 that couples energy wirelessly from the first rotatable member 122 to the second rotatable member 124 across an air gap. A capacitor may be coupled across the first lead 228 and the second lead 230 of the primary winding 226.

The second portion of the second rotatory transformer 232 comprises a secondary winding 234 defining a first lead 236 and a second lead 238. The secondary winding 234 comprises windings (e.g. one circular loop) where the loop or loops circumscribe the optical axis 126 (FIG. 1) of the endoscope 104. The variants discussed above regarding loops of the windings are equally applicable here, and will not be repeated so as not to unduly lengthen the specification. The secondary winding 234 is disposed within the endoscope 104, and specifically disposed within the second rotatable member 124. The secondary winding 234 is part of the second rotary transformer 232 along with the primary winding 226 that couples energy wirelessly from the first rotatable member 122 to the second rotatable member 124 across an air gap. A capacitor may be coupled across the first lead 236 and the second lead 238 of the secondary winding 234.

The secondary winding 234 couples to a rectifier 240, which rectifies an alternating current (AC) signal induced on the secondary winding 234 to a direct current (DC) signal applied to the LEDs 242. The LEDs 242 are shown connected in series, but any suitable arrangement is possible (e.g., parallel), and any non-zero number LEDs 242 may be used. In some cases the rectifier 240 is a full-wave rectifier, but in other cases a half-wave rectification may be sufficient. In yet still other cases, the rectification represented by rectifier 240 may be implemented by use of synchronous rectification, for example, using metal-oxide semiconductor field effect transistors (MOSFET) switched to perform the rectification function. Moreover, depending on how the LEDs 242 are coupled, in some cases the rectifier 240 may be omitted and the rectification may be implemented by the LEDs 242 themselves.

The example endoscopic system 100 may further comprise a charge coupled device (CCD) array 244 (hereafter CCD array 244) disposed within the camera head 102. The CCD array 244 is designed and constructed to capture images of the surgical field that propagate along the endoscope 104, and thus the CCD array 244 may be in operational relationship to the optical axis 126 (FIG. 1) of the overall device. The CCD array 244 may couple to a CCD controller 246 that reads the CCD array 244 and sends captured images along the cable 108 (FIG. 1). While the CCD controller 246 and power controller 200 are shown as separate systems, in some cases a single controller may provide the functionality of both the power controller 200 and the CCD controller 246.

In operation, the LEDs 242 are powered by the camera head 102. That is, the power controller 200 and the driver circuit 206 apply an AC signal having a frequency to the primary winding 212 of the first rotary transformer 218. An AC signal is induced upon the secondary winding 220 of the first rotary transformer 218. The AC signal induced on the secondary winding 220 is applied to the primary winding 226 of the second rotary transformer 232. An AC signal is induced upon the secondary winding 234 of the second rotary transformer 232. The AC signal induced upon the secondary winding 234 is rectified by the rectifier 240 and then applied to the LEDs 242. When more light is desired, the power controller 200 and driver circuit 206 may increase the voltage of the AC signal applied to the primary winding 212 of the first rotary transformer 218. In some cases, and for reasons that will be discussed more below, increasing the voltage may be accompanied by a change in frequency of the AC signal. The increased voltage propagates along the electrical circuit to result in greater voltage and current through the LEDs 242. When less light is desired, the power controller 200 and the driver circuit 206 may decrease the voltage of the AC signal applied to the primary winding 212 of the first rotary transformer 218. Again, for reasons that will be discussed more below, decreasing the voltage may be accompanied by a change in frequency of the AC signal. The decreased voltage propagates along the electrical circuit to result in less voltage and current through the LEDs 242. Wirelessly sending power from the camera head 102 to the LEDs 242 takes place regardless of the rotational orientation of the first rotatable member 122 and second rotatable member 124. Stated otherwise, the rotational orientation of the rotary transformers does not substantially affect the power delivery aspects.

The camera head 102 may be designed and constructed to couple to many types of endoscopes. In some cases, the camera head 102 may couple to an endoscope that does not have the ability to accept power from the camera head 102. In further cases, the camera head 102 may attempt to, at least initially, provide power when no endoscope is present. Thus, example embodiments are directed to a camera head 102 that determines whether it is mechanically coupled to an endoscope, and if mechanically coupled the camera head 102 further determines whether the endoscope accepts wireless power to power an LED within the endoscope.

In example cases the camera head 102, and specifically the power controller 200 and driver circuit 206, apply an identification signal to the primary winding 212 within the camera head 102. The identification signal may have a swept frequency. The swept frequency may range from about 1.0 Mega-Hertz (MHZ) to about 4.0 MHz. In other cases, the swept frequency may range from about 1.5 MHz to about 2.5 MHz. In yet still other cases, the beginning or initial frequency of the swept frequency may be electrically dictated by the resonant frequency of a resonant network coupled to the primary winding 212. The swept frequency may include a signal that, over a period of time, has a plurality of discreet frequencies with each discreet frequency individually present at a particular point in time within the period of time. For example, swept frequency may include a plurality of discreet frequencies at intervals (e.g., 100 kilo-Hertz (kHz) intervals). In other cases, the swept frequency may be performed, with respect to each frequency, by alternating between two closely spaced frequencies to achieve an average frequency. This allows use of coarser frequency settings while achieving fine enough frequency resolution. The swept frequency may alternately include a signal that, over a period of time, smoothly varies in frequency over the period of time. Regardless of the precise nature of the swept frequency, the identification signal is applied to the primary winding 212 of the camera head 102.

During application of the identification signal, the power controller 200 and driver circuit 206 may measure power provided to the primary winding 212 as a function of frequency. Based on the power delivered as a function of frequency, the camera head 102 (e.g., the power controller 200 and/or driver circuit 206) may determine whether the camera head 102 is mechanically coupled to an endoscope. And if the camera head 102 is coupled to an endoscope, the camera head 102, and specifically the power controller 200 and/or driver circuit 206, may determine whether the attached endoscope accepts power wirelessly to power the LEDs.

Figure 3:
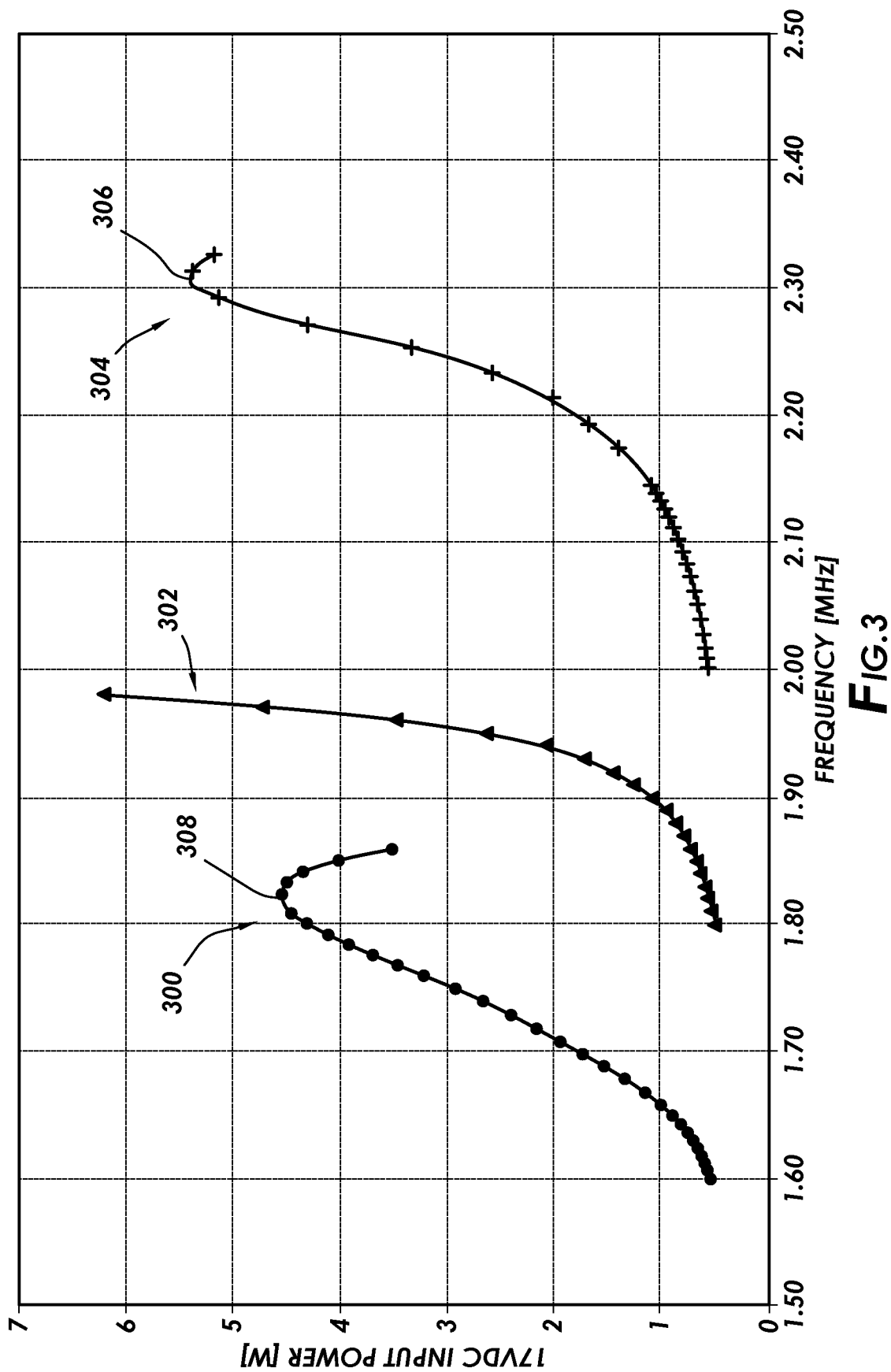
FIG. 3 shows a graph of power as a function of frequency of the identification signal, in accordance with example embodiments.

FIG. 3 shows a graph of power as a function of frequency of the identification signal, in accordance with example embodiments. In particular, FIG. 3 shows three example situations: an endoscope attached to the camera head 102 where the endoscope has the ability to accept power wirelessly (curve 300); no endoscope attached to the camera head 102 (curve 302); and an endoscope attached to the camera head 102 but the endoscope cannot accept power wirelessly (curve 304). Each will be addressed in turn.

In situations where the camera head 102 is not coupled to an endoscope, the power provided as a function of frequency by the identification signal to the primary winding 212 may look similar to the curve 302. That is, the power may increase rapidly as a function of frequency. In example systems, the application of the identification signal may cease when the power provided exceeds a predetermined threshold (e.g., 6 Watts as shown). The threshold may be, for example, selected to implement electrical current flow limits and/or functional safety limits, independent of whether a peak power actually exists. The example curve 302 does not have an inflection point where the first derivative changes signs. Stated non-mathematically, the rate of change the curve 302 does not have a point where the rate of change value goes from positive to negative. Thus, in some example cases the power controller 200 and/or the driver circuit 206 may determine that no endoscope is present by determining that no inflection point is present in the power as a function of frequency. In addition to, or in place of, the lack of an inflection point, the power controller 200 and/or driver circuit 206 may determine that no endoscope is attached based on the power provided reaching the predetermined threshold.

Now consider a situation where the camera head 102 is mechanically and optically coupled to an endoscope that does not accept power wirelessly. In such situations, the power as a function of frequency provided by the identification signal to the primary winding 212 may look similar to the curve 304. That is, the power may increase rapidly as a function of frequency initially, and then the power as a function of frequency has an inflection point 306 where the first derivative changes signs. Stated non-mathematically, the rate of change the curve 304 has an inflection point 306 where the rate of change value goes from positive to negative with increasing frequency. In accordance with example embodiments, the power controller 200 and/or the driver circuit 206 determines that the attached endoscope does not accept wireless power when the inflection point 306 occurs at a frequency above a predetermined frequency (e.g., above 2.0 MHZ). Stated otherwise, the inflection point 306 being above the predetermined frequency indicates an endoscope is present, but the endoscope does not accept wireless power.

Now consider a situation where the camera head 102 is mechanically and optically coupled to an endoscope that accepts power wirelessly. In such situations, the power as a function of frequency provided by the identification signal to the primary winding 212 may look similar to the curve 300. That is, the power may increase rapidly as a function of frequency initially, and then the power as a function of frequency has an inflection point 308 where the first derivative changes signs. Stated non-mathematically, the rate of change of the curve 300 has an inflection point 308 where the rate of change value goes from positive to negative with increasing frequency. The power controller 200 and/or the driver circuit 206 determines that the attached endoscope accept wireless power when the inflection point 308 occurs at a frequency below a predetermined frequency (e.g., below 2.0 MHZ). Stated otherwise, the inflection point 308 being below the predetermined frequency indicates an endoscope is present, and that endoscope accepts wireless power.

Still referring to FIG. 3, as between the cases where an endoscope is present (curves 300 and 304) on the one hand, and no endoscope being present (curve 302) on the other hand, the power controller 200 and/or the driver circuit 206 may determine that an endoscope is present when an inflection point can be found in the power as a function of frequency of the identification signal.

Figure 4:
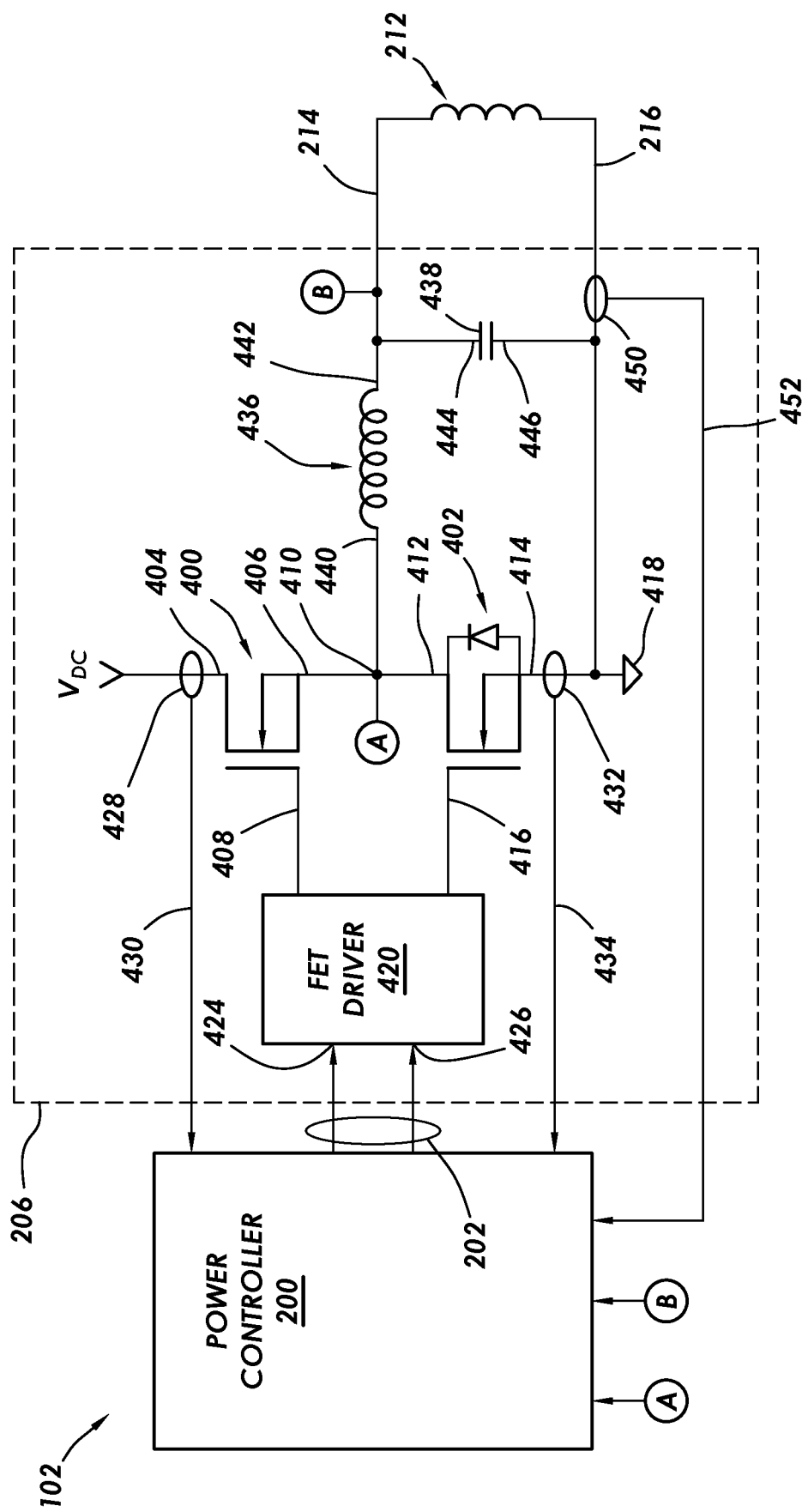
FIG. 4 shows a partial block diagram, and partial electrical schematic, of the camera head in accordance with at least some embodiments.

FIG. 4 shows a partial block diagram, and partial electrical schematic, of the camera head 102 in accordance with at least some embodiments. In particular, FIG. 4 shows the power controller 200 coupled to the driver circuit 206. The driver circuit 206, in turn, is coupled to the primary winding 212 by way of first lead 214 and second lead 216. The example driver circuit 206 comprises two electrically controlled switches: a high-side electrically controlled switch 400; and a low-side electrically controlled switch 402. In the example shown, the electrically controlled switches take the form of field effect transistors (FETS), but any suitable electrically controlled switch may be used (e.g., junction transistors). Thus, the high-side electrically controlled switch 400 will be referred to as high-side FET 400, and the low-side electrically controlled switch will be referred to as low-side FET 402. High-side FET 400 defines a drain 404, a source 406, and a gate 408. The drain 404 couples to a input voltage VDc (e.g., 12-25 Volts). The source 406 couples to a switch node 410. The low-side FET 402 defines a drain 412, a source 414, and a gate 416. The drain 412 couples to the switch node 410, and the source 414 couples to ground or common 418.

The example driver circuit 206 further includes a FET driver 420 that couples to the gate 408 of the high-side FET 400, and also couples to the gate 416 of the low-side FET 402. The example FET driver 420 defines high-side gate input 424 and a low-side gate input 426. Thus, in the example case the drive output 202 from the power controller 200 comprises two separate and distinct outputs. The FET driver 420 is designed and constructed to drive the gate 408 to make the high-side FET 400 conductive when the high-side gate input 424 is asserted, and the FET driver 420 is further designed and constructed to drive the gate 416 to make the low-side FET 402 conductive when the low-side gate input 426 is asserted. In use, the power controller 200 alternates between making the high-side FET 400 conductive and the low-side FET 402 conductive. The FET driver 420 implements a dead time or dead zone between conduction times to ensure the input voltage Voc is not shorted to common 418 through the FETs, sometimes referred to as shoot through. Moreover, the FET driver 420 ensures that, when the high-side FET 400 is intended to be conductive, a sufficient voltage can be applied to the gate 408 to make the high-side FET 400 conductive (e.g., the gate 408 voltage slightly higher than the source 406 voltage). Any currently available or after-developed FET driver may be used, such as a part number LMG1205YFXR driver available from Texas Instruments of Dallas, Texas, or drivers for gallium nitride PE29101 FETs available from pSemi Corporation (a Murata company) of San Diego, California.

The example power controller 200 controls the FETs based on one or more parameters of the circuit. In example cases, the power controller 200 senses current flow through high-side FET 400 when the FET is conductive by way of a current sense transformer 428 defining a sense line 430. Thus, the power controller 200 is coupled to the sense line 430. As will be discussed more below, the power controller 200 controls the on-time or conduction time of the high-side FET 400 based on the peak current as sensed through the current sense transformer 428. The current sense transformer 428 is merely an example of one way to sense the current; however, any suitable current sensing system may be used (e.g., a current sense resistor between the input voltage VDc and the drain 404).

Still referring to FIG. 4, in example cases the power controller 200 also senses current flow through low-side FET 402 when the FET is conductive by way of a current sense transformer 432 defining a sense line 434. Thus, the power controller 200 is coupled to the sense line 434. As will be discussed more below, the power controller 200 may control the on-time or conduction time of the low-side FET 402 based on the current as sensed through the current sense transformer 432. More particularly, the power controller 200 may make the low-side FET 402 non-conductive when current flow through the low-side FET 402 is about to reverse direction. The current sense transformer 432 is merely an example of one way to sense the current; however, any suitable current sensing system may be used (e.g., a current sense resistor between the source 414 and the common 418). In addition to, or in place of, the current sense transformer 432, the power controller 200 may couple to the sense node 410 as shown by the "bubble A" connection. Thus, rather than sensing current reversal through the low-side FET 402, the power controller 200 may sense a voltage reversal as an indication to make the low-side FET 402 non-conductive (and shortly thereafter the high-side FET 400 conductive).

The switch node 410 in the example system couples to resonant network in the example form of an inductor 436 and capacitor 438. In particular, the inductor 436 defines a first lead 440 coupled to the switch node 410, and a second lead 442 that couples to the first lead 214 of the primary winding 212. The capacitor 438 defines a first lead 444 coupled to the second lead 442 of the inductor, and a second lead 446 coupled to the common 418. Thus, the inductor 436 is coupled in series with the primary winding 212, and the capacitor 438 is coupled in parallel with the primary winding 212. The inductor 436 and capacitor 438 thus form an LC tank circuit coupled between the switch node 410 and the primary winding 212.

The driver circuit 206, considered with the primary winding 212, may be operated similarly to the primary side of an inductor-inductor-capacitor (LLC) resonant switching power converter. That is, the high-side FET 400 and low-side FET 402 cooperate to electrically chop the input voltage Voc in such a way as to provide an AC signal to the inductor 436, the capacitor 438, and the primary winding 212. In particular, consider a steady state operating condition where the power controller 200 and the driver circuit 206 are providing power to one or more LEDs within an endoscope. In operation, the power controller 200 makes the low-side FET 402 non-conductive, the high-side FET 400 conductive, and monitors current by way of example current sense transformer 428. Thus, current tends to flow from the input voltage VDc, through the high-side FET 400, and through the inductor 436. However, current through an inductor cannot change instantaneously, and the current through the inductor 436 and high-side FET 400 builds over time. When the current reaches a peak current value, the power controller 200 makes the high-side FET 400 non-conductive, and makes the low-side FET 402 conductive. Again because current through an inductor cannot change instantaneously, current flow continues from the common 418, through the low-side FET 402, and through the inductor 436 for a period of time.

However, the inductor 436 and the capacitor 438 are a resonant network. Thus, with the low-side FET 402 conductive and the high-side FET 400 non-conductive, current flow through the inductor ramps down and then reverses direction. In example embodiments the low-side FET 402 remains conductive, and thus reverse current flows through the inductor 436, and through the low-side FET 402 to the common 418. Again, however, because of the resonant network the reverse current also ramps down, and will eventually reverse direction again. At the point where current is about to reverse direction again, the power controller 200 makes the low-side FET 402 non-conductive, the high-side FET 400 conductive, and the cycle starts anew. The sensing of the current reversal may take place with the current sense transformer 432 on the low side, or may take place by the power controller 200 sensing voltage on the switch node 410. Thus, an AC signal is applied to the primary winding 212, and that AC signal propagates through the rotatory transformers to the LEDs.

The inductor 436 and capacitor 438 operate as a band-pass filter at a resonant frequency. However, the resonant frequency is affected by not only the inductor 436 and capacitor 438, but also all the capacitances "seen" through the rotatory transformers. The highest power transfer rate occurs when the fundamental frequency of the AC signal created by the FETs is at the resonant frequency.

Now consider that the surgeon desires to dim the light from a brightest setting (e.g., the desire conveyed by interaction with the buttons 114 (FIG. 1)). In order to dim the light, the power provided to the LEDs is reduced. In some example cases, the power is reduced by lowering the peak current at which the high-side FET 400 is made non-conductive. Lowering the peak current thus lowers peak voltage seen by the primary winding 212. Moreover, lowering the peak current also lowers the time it takes the current through the inductor to reach zero and reverse direction. It follows that lowering the peak current not only lowers the power, but also lowers the operating or drive frequency in the operational mode discussed above. Other operational techniques are possible, such as allowing the inductor 436 to oscillate through several cycles before charging the system again with the high-side FET 400.

Referring briefly to FIG. 2, in example systems there is a capacitance in each of the first rotatable member 122 and the second rotatable member 124. There may also be parasitic capacitances throughout the system. When an endoscope, such as endoscope 104, is mechanically coupled to the camera head 102, the driver circuit 206 "sees" a resonant network that includes not only the inductor 436 and capacitor 438, but also all the downstream capacitances through the first rotatory transformer 218 and second rotatory transformer 232. It follows that the resonant frequency is different: when no endoscope is attached; when an endoscope that accepts wireless power is attached; and when an endoscope that cannot accept wireless power is attached. Returning now to endoscope identification aspects.

Referring again to FIG. 4, in example systems the power converter 200 and driver circuit 206 apply an identification signal to the primary winding 212 by alternating conductive states of the high-side FET 400 and low-side FET 402. The conduction time is controlled to control the frequency of the identification signal. The power controller 200 measures power as a function of frequency of the identification signal. The power as a function of frequency may be determined using the current sense transformer 428, the current sense transformer 432, and a voltage sensed at the switch node 410. That is, knowing the value of the inductance of inductor 436 and the current flow through the inductor 436, the power controller 200 may calculate the power provided to the primary winding 212. In yet still other cases, the power controller 200 may monitor the voltage provided to the primary winding 212 directly, such as by directly monitoring the voltage on the first lead 214 (as illustratively shown by bubble B). Similarly, the power controller 200 may monitor current through the primary winding 212 directly, such as by a current sense transformer 450 defining sense line 452 coupled to the power controller 200. It follows that power sense input 204 (FIG. 2) is representative of any or all the sense lines for sensing current, and voltage sensing connections.

Based on the power provided as function of frequency, the power controller 200 may determine whether the camera head is mechanically coupled to an endoscope (e.g., no inflection point, and/or power reaches predetermined threshold). And if an endoscope is present, the power controller may determine whether the endoscope can accept wireless power (e.g., based on presence and frequency of an inflection point).

Figure 5:
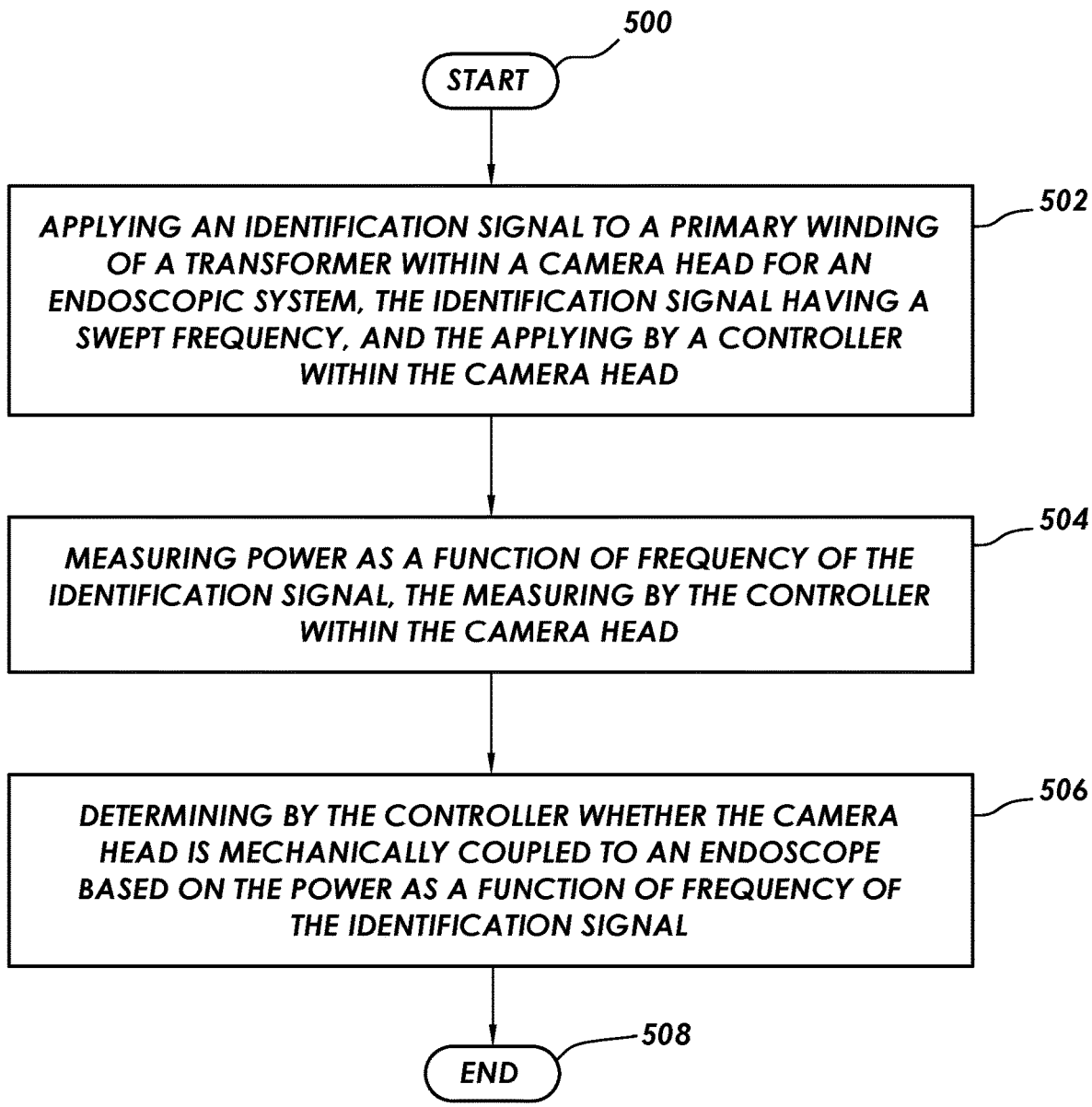
FIG. 5 shows a method in accordance with at least some embodiments.

FIG. 5 shows a method in accordance with at least some embodiments. In particular, the method starts (block 500) and comprises: applying an identification signal to a primary winding of a transformer within a camera head for an endoscopic system, the identification signal having a swept frequency, and the applying by a controller within the camera head (block 502); measuring power as a function of frequency of the identification signal during the applying of the identification signal, the measuring by the controller within the camera head (block 504); and determining by the controller whether the camera head is mechanically coupled to an endoscope based on the power as a function of frequency of the identification signal (block 506). Thereafter, the method ends (block 508).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A camera head for an endoscope, comprising:
a camera defining an optical axis;
a power controller defining a drive output;
a driver circuit having a drive input coupled to the drive output;
a primary winding of a transformer circumscribing the optical axis, the primary winding coupled to the driver circuit;
the power controller configured to:
command the driver circuit to apply an identification signal to the primary winding, the identification signal having a swept-frequency;
measure power as a function of frequency of the identification signal during application of the identification signal;
determine whether the camera head is mechanically coupled to the endoscope based on the power as a function of frequency of the identification signal; and
if the camera head is coupled to the endoscope, determine whether the endoscope accepts wireless power to drive a light emitting diode (LED) within the endoscope.

2. The camera head of claim 1 wherein when the power controller determines whether the camera head is mechanically coupled to an endoscope, the power controller is further configured to find an inflection point in the power as a function of frequency, and wherein presence of the inflection point is indicative of the camera head being coupled to the endoscope.

3. The camera head of claim 1 wherein when the power controller determines whether the endoscope accepts wireless power to drive the LED, the power controller is further configured to:
find an inflection point in the power as a function of frequency; and
determine that the endoscope accepts wireless power if the inflection point in the power as a function of frequency is below a predetermined threshold.

4. The camera head of claim 1 wherein when the power controller determines whether the camera head is mechanically coupled to the endoscope, the power controller is further configured to find an absence of an inflection point in the power as a function of frequency, the absence of the inflection point indicative of the camera head not being coupled to an endoscope.

5. The camera head of claim 1 wherein the driver circuit further comprises:
a high-side electrically controlled switch coupled between a source voltage and a switch node, the high-side electrically controlled switch defining a first control input;
a low-side electrically controlled switch coupled between the switch node and a ground, the low-side electrically controlled switch defining a second control input;
a first lead of the primary winding coupled to the switch node; and
a switch driver defining a high-side output coupled to the first control input, a low-side output coupled to the second control input, and the drive input coupled to the drive output of the power controller,
wherein, when the power controller commands the driver circuit to apply the identification signal to the primary winding, the power controller applies a control signal to the drive input of the switch driver.

6. The camera head of claim 5 wherein the driver circuit further comprises an inductor-capacitor tank circuit (LC tank circuit), the LC tank circuit coupled between the switch node and the first lead of the primary winding.

7. The camera head of claim 6 wherein the LC tank circuit further comprises an inductor coupled in series between the switch node and the first lead, and a capacitor coupled in parallel across the primary winding.

8. An endoscopic system, comprising:
an endoscope having a secondary winding circumscribing an optical axis of the endoscope, and the secondary winding coupled to a light emitting diode (LED) by way of a rectifier;
a camera head coupled to the endoscope, the camera head comprising:
an optical axis;
a power controller defining a drive output;
a driver circuit having a drive input coupled to the drive output;
a primary winding of a transformer circumscribing the optical axis, the primary winding coupled to the driver circuit, and the primary winding magnetically coupled to the secondary winding of the endoscope;
the power controller configured to:
command the driver circuit to apply an identification signal to the primary winding, the identification signal having a swept-frequency; measure power as a function of frequency of the identification signal during application of the identification signal;
determine that the endoscope accepts wireless power to drive the LED; and
provide power to the LED through the primary winding.

9. The endoscopic system of claim 8 wherein when the power controller determines that the endoscope accepts wireless power to drive the LED, the power controller is further configured to:
find an inflection point in the power as a function of frequency; and determine that the inflection point in the power as a function of frequency is below a predetermined threshold.

10. The endoscopic system of claim 8 wherein the driver circuit further comprises:
a high-side electrically controlled switch coupled between a source voltage and a switch node, the high-side electrically controlled switch defining a first control input;
a low-side electrically controlled switch coupled between the switch node and a ground, the low-side electrically controlled switch defining second control input;
a first lead of the primary winding coupled to the switch node; and
a switch driver defining a high-side output coupled to the first control input, a low-side output coupled to the second control input, and the drive input coupled to the drive output of the power controller,
wherein, when the power controller commands the driver circuit to apply the identification signal to the primary winding, the power controller applies a control signal to the drive input of the switch driver.

11. The endoscopic system of claim 10 wherein the driver circuit further comprises an inductor-capacitor tank circuit (LC tank circuit), the LC tank circuit coupled between the switch node and the first lead of the primary winding.

12. The endoscopic system of claim 11 wherein the LC tank circuit further comprises an inductor coupled in series between the switch node and the first lead, and a capacitor coupled in parallel across the primary winding.

* * * * *